(12) United States Patent
Looman

(10) Patent No.: US 9,487,225 B1
(45) Date of Patent: Nov. 8, 2016

(54) UTILITY SLED

(71) Applicant: Cory C. Looman, South Haven, MN (US)

(72) Inventor: Cory C. Looman, South Haven, MN (US)

( * ) Notice: Subject to any disclaimer, the term of this patent is extended or adjusted under 35 U.S.C. 154(b) by 0 days.

(21) Appl. No.: 14/689,681

(22) Filed: Apr. 17, 2015

Related U.S. Application Data

(60) Provisional application No. 62/029,841, filed on Jul. 28, 2014.

(51) Int. Cl.
| | |
|---|---|
| *B62B 13/06* | (2006.01) |
| *B62B 17/06* | (2006.01) |
| *B62B 17/00* | (2006.01) |

(52) U.S. Cl.
CPC .............. *B62B 13/06* (2013.01); *B62B 17/00* (2013.01); *B62B 17/06* (2013.01)

(58) Field of Classification Search
CPC ........ B62B 13/06; B62B 17/00; B62B 17/06
USPC .................................................. 280/19.1, 24
See application file for complete search history.

(56) References Cited

U.S. PATENT DOCUMENTS

| | | | | |
|---|---|---|---|---|
| 257,358 | A * | 5/1882 | McIlroy .................. | B62B 13/06 280/15 |
| 599,991 | A * | 3/1898 | Whittiker ................ | B62B 13/06 280/845 |
| 828,539 | A * | 8/1906 | Des Jardins ............ | B62B 13/06 280/20 |
| 1,585,575 | A * | 5/1926 | Van Husan ............. | B62B 13/06 280/28.12 |
| 1,721,159 | A * | 7/1929 | Maneval ................. | B62B 13/06 280/1 |
| 2,045,712 | A * | 6/1936 | Hornquist .............. | B62B 13/06 280/1 |
| 2,299,993 | A * | 10/1942 | Kirk ...................... | A63C 11/002 280/20 |
| 2,369,283 | A | 2/1945 | Czegka | |
| 2,473,076 | A * | 6/1949 | Scheibner .............. | A01K 97/01 135/116 |
| 2,632,454 | A * | 3/1953 | Skogen ................. | E04H 15/001 135/116 |
| 2,700,389 | A * | 1/1955 | Butcher .................. | A01K 1/02 119/444 |
| 2,950,924 | A * | 8/1960 | Gantz ..................... | B62B 19/04 280/14 |
| 3,061,326 | A | 10/1962 | Rasmussen | |
| D211,572 | S | 7/1968 | Ehrlichmann | |
| 3,406,982 | A * | 10/1968 | Jorns ....................... | A01K 5/01 217/4 |
| 3,464,735 | A * | 9/1969 | Smith ..................... | B60P 3/341 135/116 |
| 3,507,293 | A * | 4/1970 | Du Bray ................ | A01K 97/01 135/116 |
| 3,610,431 | A * | 10/1971 | Rodden ................. | B60P 3/1033 211/207 |
| 3,653,677 | A * | 4/1972 | Feser ..................... | B62B 13/18 280/24 |
| D224,907 | S | 10/1972 | Lapointe et al. | |
| 3,730,542 | A * | 5/1973 | Chadwick .............. | B62B 13/18 280/494 |
| 3,741,577 | A * | 6/1973 | Rude ...................... | B62B 13/04 280/18 |

(Continued)

*Primary Examiner* — John Walters
*Assistant Examiner* — Jacob Meyer
(74) *Attorney, Agent, or Firm* — Robert C. Montgomery; Montogomery Patent and Design, LP.

(57) ABSTRACT

A sled adapted to couple to a tow hitch on an off-road vehicle comprising a storage compartment and a lighting system. The lighting system is operated by an incorporated electrical system. A rack assembly is secured to the body of the sled. A ski frame with two (2) ski assemblies are secured to the underside of the sled frame. The sled body comprises a planar bottom with side walls and stiffening ribs located along the inner portion of the side walls.

14 Claims, 8 Drawing Sheets

(56) References Cited

U.S. PATENT DOCUMENTS

| | | | | |
|---|---|---|---|---|
| 3,779,571 A * | 12/1973 | Ahmling | ................ | B65D 19/40 280/19 |
| 3,820,805 A * | 6/1974 | Tuomala | ................ | B62B 13/16 135/116 |
| 3,874,531 A * | 4/1975 | Mayo | ....................... | B60D 1/00 280/47.35 |
| 3,900,202 A * | 8/1975 | Doble | ..................... | B62B 13/18 280/43.24 |
| 3,912,290 A | 10/1975 | Rich | | |
| 3,923,335 A * | 12/1975 | Erickson | ................... | B60F 5/00 280/19.1 |
| 4,128,258 A * | 12/1978 | Johnson | ................ | B62D 21/14 280/46 |
| 4,239,247 A * | 12/1980 | Hinz | .................... | E04H 15/001 135/133 |
| 4,245,849 A * | 1/1981 | Thiboutot | ............... | A47C 4/286 248/436 |
| 4,271,612 A * | 6/1981 | Mellingen | ................. | E01H 4/02 172/188 |
| 4,285,529 A * | 8/1981 | Vaillancourt | ........... | B62B 17/06 280/19.1 |
| 4,304,418 A | 12/1981 | Foster | | |
| 4,337,957 A * | 7/1982 | Heine | ..................... | B62B 19/04 280/14 |
| 4,389,066 A * | 6/1983 | Weir | ...................... | A61G 1/007 280/19.1 |
| 4,438,940 A * | 3/1984 | Hunt | ...................... | B62B 15/00 135/901 |
| 4,456,272 A * | 6/1984 | Kroeger | ................. | B62B 13/00 220/DIG. 13 |
| 4,631,877 A * | 12/1986 | Molodecki | ............ | E04H 15/001 280/19.1 |
| D293,309 S | 12/1987 | Robertson et al. | | |
| 4,819,956 A * | 4/1989 | Campbell | ............ | B62K 27/003 280/203 |
| 5,413,363 A * | 5/1995 | Colin | ..................... | B62B 13/16 280/14.1 |
| 5,618,152 A * | 4/1997 | Andrews | ................... | B41F 9/18 414/546 |
| 5,653,494 A * | 8/1997 | Cleall | ....................... | B60P 3/34 280/19.1 |
| 6,042,122 A * | 3/2000 | Mohr | ..................... | B62B 13/06 280/43.14 |
| 6,139,029 A * | 10/2000 | Shaw | ..................... | B62B 13/18 280/47.371 |
| 6,152,460 A * | 11/2000 | Cooper | ................... | B62B 13/06 280/15 |
| 6,168,058 B1 * | 1/2001 | Janek | .................... | B60R 9/065 220/9.2 |
| 6,270,094 B1 * | 8/2001 | Campbell | ............... | B62B 3/006 242/594.4 |
| 6,364,596 B1 * | 4/2002 | Spencer | .................. | B62B 1/18 280/47.18 |
| 6,523,776 B1 * | 2/2003 | Elder | ................... | B65H 49/325 211/85.5 |
| 6,945,743 B2 * | 9/2005 | Sherman | ................ | A01K 97/01 414/476 |
| 6,991,250 B2 * | 1/2006 | Lindsey | .................... | B62B 1/12 280/30 |
| 7,070,196 B1 * | 7/2006 | Larsen | ...................... | B63C 3/12 211/70.5 |
| 7,543,842 B1 * | 6/2009 | Fiorini | ................... | B62B 3/025 280/43 |
| 7,677,592 B2 * | 3/2010 | Giesler | ..................... | B60P 3/07 280/656 |
| 7,682,115 B1 * | 3/2010 | Jay | ........................... | B60P 3/07 410/101 |
| 7,922,550 B2 * | 4/2011 | Yeh | ....................... | A63C 5/0417 441/65 |
| 7,963,530 B1 * | 6/2011 | Garcia | ..................... | B62B 3/02 280/28 |
| 8,262,102 B2 | 9/2012 | Pendl | | |
| 8,348,301 B2 * | 1/2013 | Darling, III | .......... | A61G 1/013 280/640 |
| 8,465,031 B2 * | 6/2013 | Coghill, Jr. | ............... | B62B 1/14 280/47.35 |
| 8,505,959 B2 * | 8/2013 | Darling, III | .......... | A61G 1/013 280/640 |
| 8,746,377 B1 * | 6/2014 | Dunbar | ................. | B62B 5/0003 180/19.2 |
| 8,864,163 B1 * | 10/2014 | Buvala | ..................... | B62B 3/10 280/476.1 |
| 8,986,172 B2 * | 3/2015 | Poole | ................. | A63B 21/0552 473/441 |
| 9,132,766 B2 * | 9/2015 | Scarbrough | ............... | B60P 3/34 |
| 9,145,154 B1 * | 9/2015 | Horowitz | ................ | B62B 3/025 |
| 2004/0080128 A1 * | 4/2004 | Lindsey | .................... | B62B 1/12 280/30 |
| 2005/0236786 A1 * | 10/2005 | Bryan | ................. | A01M 31/006 280/28.12 |
| 2006/0055130 A1 | 3/2006 | Williams, Jr. | | |
| 2006/0131834 A1 * | 6/2006 | Larsen | ..................... | B63C 3/12 280/414.1 |
| 2006/0208440 A1 * | 9/2006 | Clark | ..................... | B62B 3/001 280/47.35 |
| 2007/0029760 A1 * | 2/2007 | Darling, III | .......... | A61G 1/013 280/640 |
| 2009/0212535 A1 * | 8/2009 | Darling, III | .......... | A61G 1/013 280/651 |
| 2009/0250888 A1 * | 10/2009 | Howlett | ............. | A63B 71/0009 280/21.1 |
| 2010/0059950 A1 * | 3/2010 | Coghill, Jr. | ............... | B62B 1/14 280/47.26 |
| 2011/0309601 A1 * | 12/2011 | Darling, III | .......... | A61G 1/013 280/657 |
| 2012/0112426 A1 * | 5/2012 | Volkmann | ............... | B62B 1/002 280/107 |
| 2013/0049311 A1 * | 2/2013 | Metters | ................... | B62B 3/027 280/33.998 |
| 2016/0052355 A1 * | 2/2016 | Brown | ................... | B60D 1/065 280/511 |

\* cited by examiner

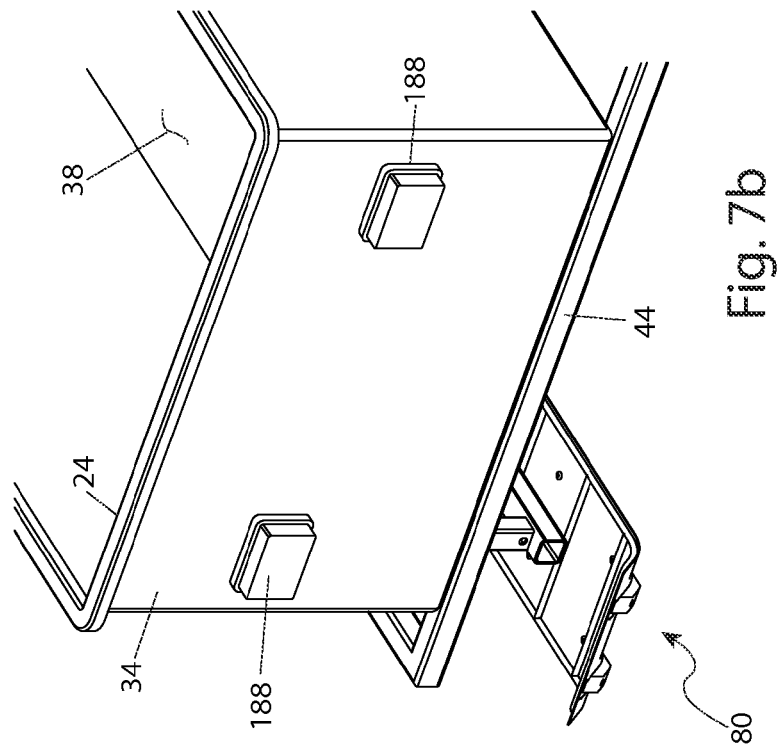
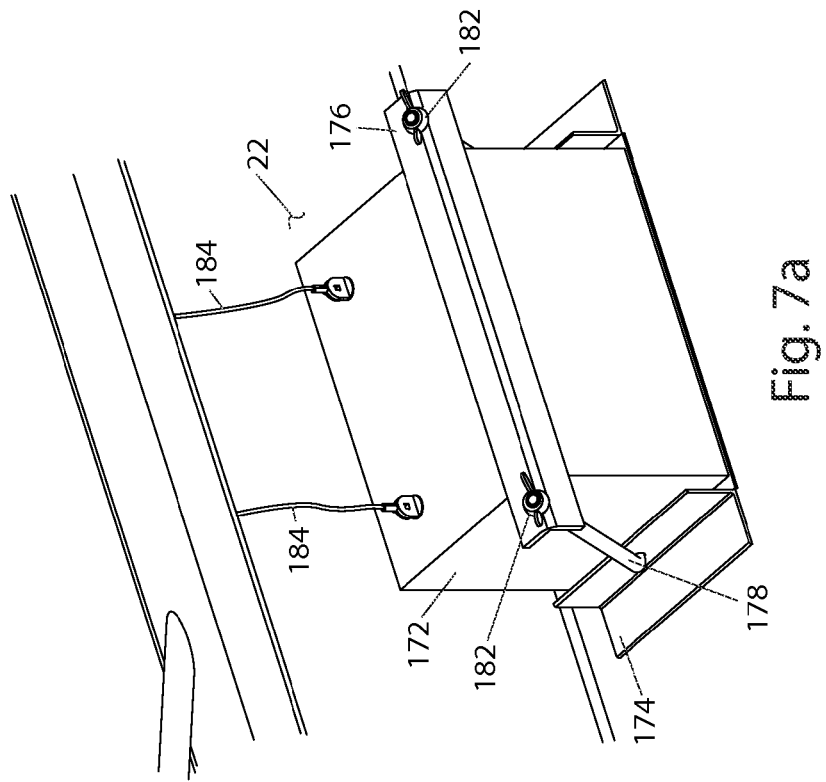

UTILITY SLED

RELATED APPLICATIONS

The present invention was first described in and claims the benefit of U.S. Provisional Application No. 62/029,841, filed Jul. 28, 2014, the entire disclosures of which are incorporated herein by reference.

FIELD OF THE INVENTION

The present invention relates generally to a sled adapted to couple to a tow hitch on an off-road vehicle.

BACKGROUND OF THE INVENTION

A great number of people around the world enjoy fishing. Whether fishing for food or for the sport of it, the calmness and serenity of the sport, coupled with the excitement of landing "the big one," makes fishing a popular pastime. However; in the sport of fishing as with almost any sport, one may quickly accumulate a numerous variety of fishing rods and accessories. As a result, transportation of one's fishing rods and accessories to and from the fishing area may become a task which diminishes the overall enjoyment of the sport.

While being exposed to the outdoors while traversing to a fishing site is often highly enjoyable the actual effort associated with carrying fishing equipment to the site is often not. Fisherman are sometimes forced to carry multiple fishing rods and tackle boxes from their home, to a car, to a hotel or campsite, through rough terrain to a boat, and then back again. As these items are transported oftentimes several trips may be necessary to accommodate all of the equipment and other items, such as food and drink.

With regard to ice fishing, the transportation of fishing equipment and survival gear is all the more difficult given the inhospitable terrain associated with ice fishing. Accordingly, there exists a need for a simplified sled to easily and effectively transport fishing equipment, particularly across snow and ice during travelling to a favorite ice fishing spot.

SUMMARY OF THE INVENTION

The inventors have recognized the aforementioned issues and inherent problems and observed that there is a lack in the prior art for a means to provide a sled adapted to couple to a tow hitch on an off-road vehicle.

It is therefore an object of the invention to provide a sled, comprising a frame, a body mounted on the frame, a rack assembly mounted to a portion of the body and a pair of ski assemblies each attached to the bottom of the frame. The frame is configured to be towed by a vehicle with the rack assembly adapted to securably retain items therein. The body has a planar bottom and encircling sidewalls with a peripheral lip. The rack assembly is mounted to the lip. Stiffening ribs are located along an inner portion of the sidewalls. The forgoing configuration may also come with a cover which is capable of being removably placed over the body. The forging configuration may also be equipped with a means of illumination means in electrical communication with a power source for providing illumination in a vicinity of the sled. The means of illumination further comprises at least one clearance light located on a rear portion of the body which is selectively controlled by a clearance light switch. The means of illumination further comprises at least one (1) interior light located on an inner surface of one of the sidewalls which is selectively controlled by an interior light switch.

Each rack assembly comprises a first beam, a second beam and at least a pair of posts. Each beam is in the shape of a square tube and each post is in the shape of a cylindrical bar. Each post is secured near a midpoint of a given beam at a distance from any other given beam equidistant from the midpoint of the beam. Each post is oriented parallel to the longitudinal axis of the beam in a vertical plane. Disposed at both ends of the first beam and the second beam is an aperture. The first beam and the second beam are secured to "C"-shaped rack mount brackets by means of rack mount bracket pivot pins.

Each ski assembly comprises a ski frame. The ski frame comprises an elongated body with an upturned first distal end and a pair of posts upstanding from the ski frame. Each post is slidably affixed and able to be secured into bottom ends of one (1) of a pair of legs extending downward from the sled frame. There is a plurality of cross-members spaced equidistantly along the ski frame and oriented perpendicularly therefrom and a runner longitudinally attached to and coextensive with the ski frame and the plurality of cross-members. Each runner further comprises a plurality of longitudinal ridges molded into a bottom face thereof. The ridges are sized so as to enable a ski insert to be inserted on the runner between adjacent ridges.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7*a* is an isolated view of the battery 172 of the utility sled 10 in accordance with the preferred embodiment of the present invention;

FIG. 7*b* is an isolated view of the clearance lights 188 of the utility sled 10 in accordance with the preferred embodiment of the present invention;

DESCRIPTIVE KEY

Figure 1:
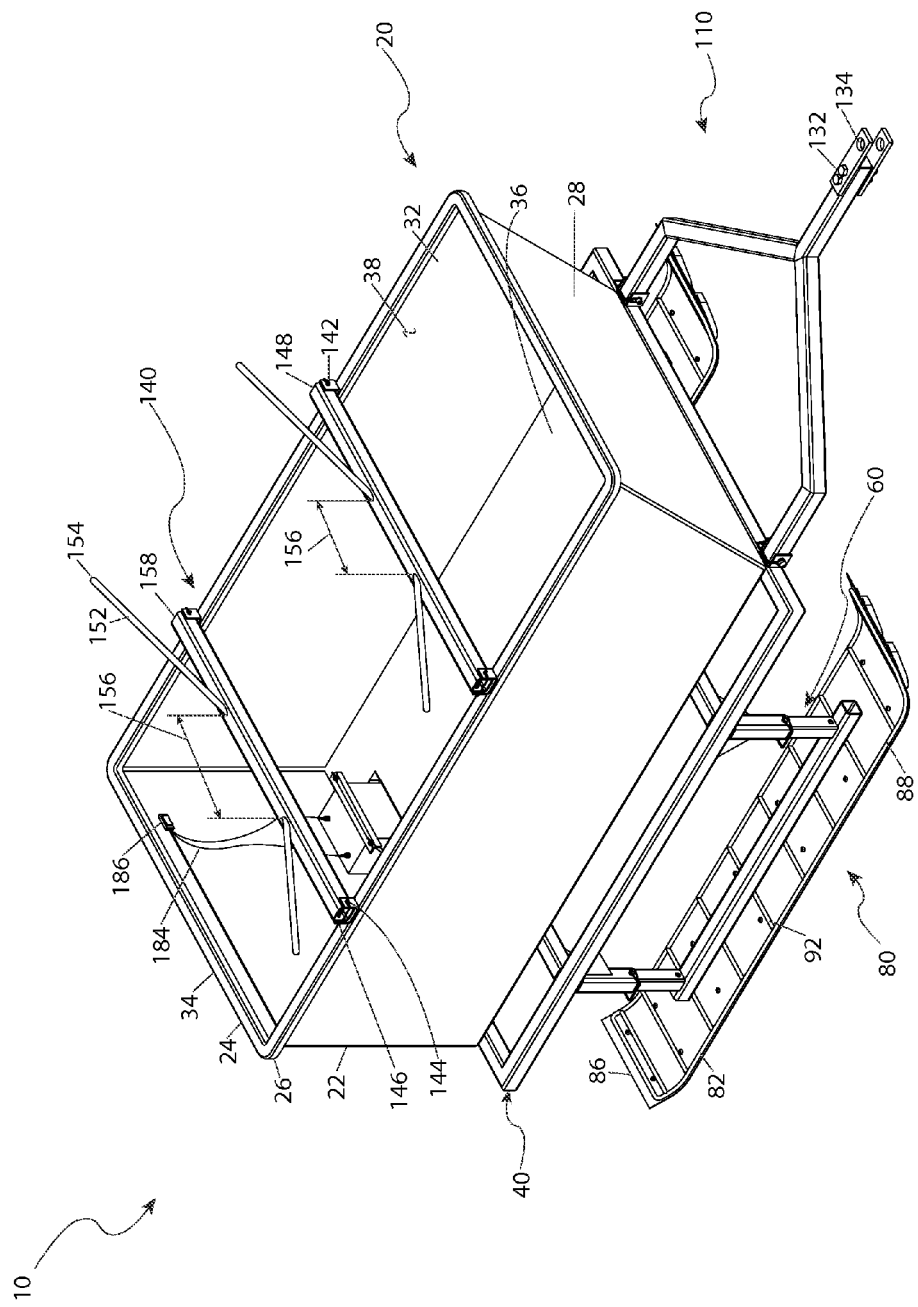
FIG. 1 is an isometric view of a utility sled 10 in accordance with the preferred embodiment of the present invention.

10 utility sled
20 body
22 sidewall 24 sidewall lip
26 curvature
28 front
32 side
34 rear
36 bottom
38 interior
40 frame
42 lateral member
44 first cross member
46 second cross member
60 leg
62 upper leg member
64 lower leg member
66 upper leg outer brace
68 upper leg inner brace
72 leg aperture
74 leg pin
76 leg pin retainer
78 ski support
80 ski
82 ski frame
84 leading end
86 trailing end
88 lateral tube
92 cross tube
94 runner
96 ridge
98 bottom face
104 ski insert
106 insert fastener
110 tongue assembly
112 first lateral member
114 second lateral member
116 first angled member
118 second angled member
122 central member
124 tongue clevis
126 clevis pin
128 clevis pin retainer
132 offset strap
134 strap aperture
136 strap fastener
138 hitch pin
140 rack assembly
142 rack mounting bracket
144 mounting bracket pivot pin
146 pivot pin retainer
148 first beam
152 post
154 post end
156 spread
158 second beam
160 cover
162 band
170 electrical system
172 battery
174 battery anchor
176 battery tie-down
178 tie down fastener
182 wing nut
184 conductor
186 clearance light switch
188 clearance light
192 interior light switch
194 interior light
196 illumination

DETAILED DESCRIPTION OF THE PREFERRED EMBODIMENT

The best mode for carrying out the invention is presented in terms of its preferred embodiment, herein depicted within FIGS. 1 through 8*b*. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a utility sled (herein referred to as the "apparatus") 10, which provides a means to transport a plurality of items across a snow, or ice, covered terrain in, or on, a body 20 mounted on a frame 40 with skis 80 able to be towed behind an off-road vehicle.

Referring now to FIG. 1, an isometric view of the apparatus 10, according to the preferred embodiment of the present invention, is disclosed. The apparatus 10 includes a body 20 supported on a frame 40 provided with skis 80. The body 20 is generally configured to be rectangular with a planar bottom 36 and encircling sidewalls 22 joined along all horizontal and vertical abutting edges and formed in one (1) piece to define a hollow interior 38. The sidewalls 22 are preferably vertical along the sides 32 and the rear 34 while sloping outward from the bottom 36 to the top along a front 28. The bottom 36 and sidewalls 22 are made of a formed thermoplastic material and as such may be presented in a wide variety of colors and surface textures. The sidewalls 22 will have a peripheral sidewall lip 24 at an upper edge configured to be a transformation from a vertical planar surface through some ninety degree (90°) curvature 26 to a horizontal planar surface for some minimal distance and then back through preferably a symmetrical curvature 26 to a vertical planar surface. The sidewalls 22 may be provided with horizontal or vertical ribs, folds, or corrugations to increase the structural rigidity of the body 20 without limiting the scope of the apparatus 10.

Disposed along the horizontal surface of the sidewall lip 24 is a plurality of rack mounting brackets 142 for the purpose of attaching a rack assembly 140 to the body 20. A rack assembly 140 is configured to be at least a first beam 148 and a second beam 158 spanning across the opposite sides 32 of the body 20 to support cargo for transportation which may be too long to be accommodated within the body 20. The first beam 148 and the second beam 158 are preferably composed of square tube steel. It is understood that other materials, such as, but not limited to, other metals, wood, or rigid thermoplastics, or other shapes may be utilized without limiting the scope of the apparatus 10. Disposed along the beams 148, 158 is at least one (1) pair of posts 152 which are supports intended to stabilize and contain the chosen cargo. The posts 152 are preferably composed of a cylindrical bar of the same constituent material as the beams 148, 158 having a hemispherical post end 154. The posts 152 are attached near a midpoint of the beam 148, 158 at some spread 156 distance from each other and equidistant from the midpoint of the beam 148, 158. The posts 152 are oriented parallel to the longitudinal axis of the beams in a vertical plane and are angled up from the longitudinal axis in a horizontal plane and away from the midpoint of the beam 148, 158. The spread 156 between the posts 152 may vary from the first beam 148 to the second beam 158.

Disposed at both ends of the first beam 148 and the second beam 158 is an aperture (not shown) for the insertion of a mounting bracket pivot pin 144 to secure the beams 148, 158 to the rack mount brackets 142. As previously stated, the rack mounting brackets 142 are attached to the horizontal surface of the sidewall lip 24. The rack mounting brackets 142 are preferably configured to be "C"-shaped, metal brackets having aligned apertures (not shown) in the parallel members for the insertion of the mounting bracket pivot pins 144. The rack mounting brackets 142 may be provided with any apertures and fasteners, of any kind, to included rivets, headed fasteners, or the like, to secure the attachment thereof to the sidewall lip 24. The mounting bracket pivot pins 144 are preferably headed, cylindrical metal rods provided with pivot pin retainers 146 such as cotter pins, locking straps, or the like. The mounting bracket pivot pins 144 may be removed from the rack mounting brackets 142 along one (1) side of the body 20 and the first beam 148 and the second beam 158 may be pivotally rotated about the mounting bracket pivot pins 144 securing the opposite side of the beams 148, 158 so as to be removed from obscuring the interior 38 for loading or unloading cargo from the apparatus 10. The rack assembly 140 may also be removed entirely from the body 20 by removing all of the mounting bracket pivot pins 122 if the use of the rack assembly 140 is not required.

Figure 2:
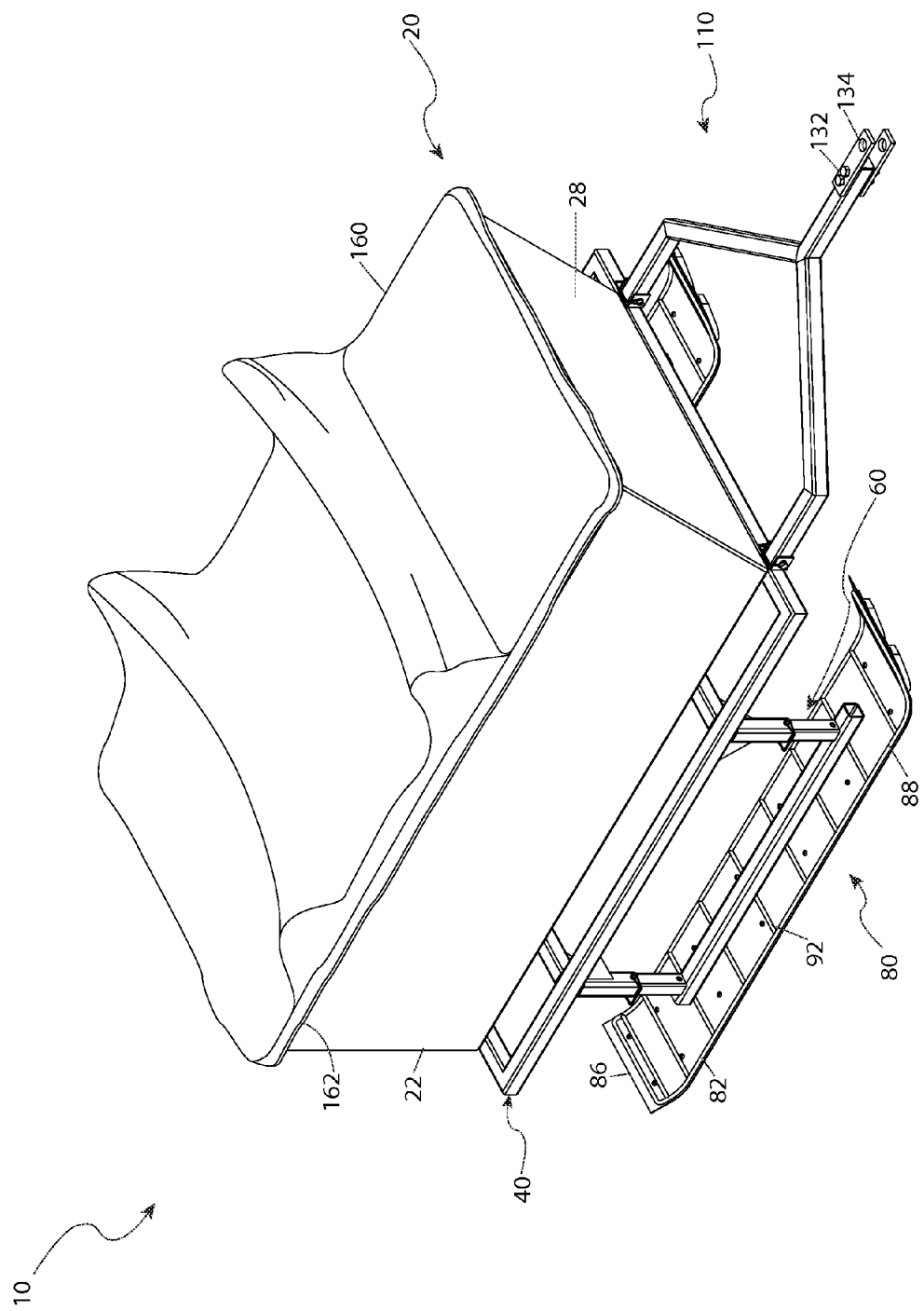
FIG. 2 is an isometric view of the utility sled 10 with a cover 160 in accordance with the preferred embodiment of the present invention.

Referring now to FIG. 2, an isometric view of the apparatus 10 with a cover 160, according to the preferred embodiment of the present invention, is disclosed. The apparatus 10 is provided with a removable cover 160 which can be installed over the body 20 to conceal and protect any cargo transported therein. The cover 160 is preferably composed of a waterproof nylon material and fitted specifically to drape over the installed rack assembly 140 and an upper portion of the body 20. It is understood that other materials may be utilized in the fabrication of the cover 160 without limiting the scope of the apparatus 10. The cover 160 is configured to have an elastic band 162 attached around the perimeter thereof, preferably by means of stitching, so as to gather the perimeter in the area under the sidewall lip 24 of the body 20 so as to retain the cover 160.

Figure 3:
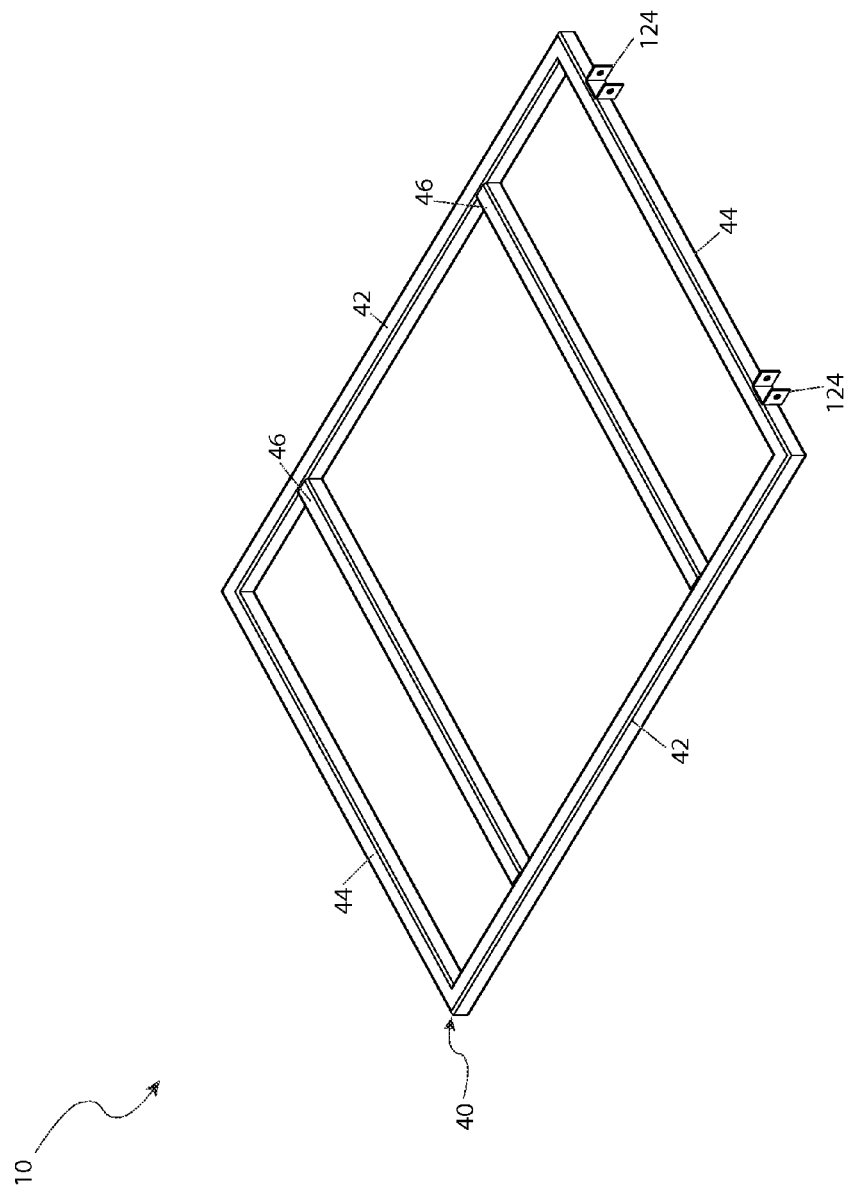
FIG. 3 is an isolated view of a frame 40 of the utility sled 10 in accordance with the preferred embodiment of the present invention.

Referring now to FIG. 3, an isolated view of the frame 40 of the apparatus 10, according to the preferred embodiment of the present invention, is disclosed. The frame 40 is preferably configured to be a rectangular, welded, tubular metal structure. The frame 40 may be configured to be any other geometric shape, such as, but not limited to, a hexagon, or utilize other materials of construction, without limiting the scope of the apparatus 10. A pair of parallel lateral members 42 is attached perpendicularly at either end of a pair of first cross members 44. The abutting joints of the lateral members 42 and the first cross members 44 are mitered at appropriate intersecting angles to provide a smooth fit and a full penetration weld. At least two (2) second cross members 46 are positioned between the lateral members 42 and continuously welded, with appropriate bead, around the perimeter of each end to permanently secure the second cross members 46. The second cross members 46 span the distance between the lateral members 42. The body 20 is attached to the frame 40 and retained thereon preferable with a plurality of self-threading fasteners inserted from the interior 38 and penetrating the first cross members 44 and the second cross members 46.

Figure 4:
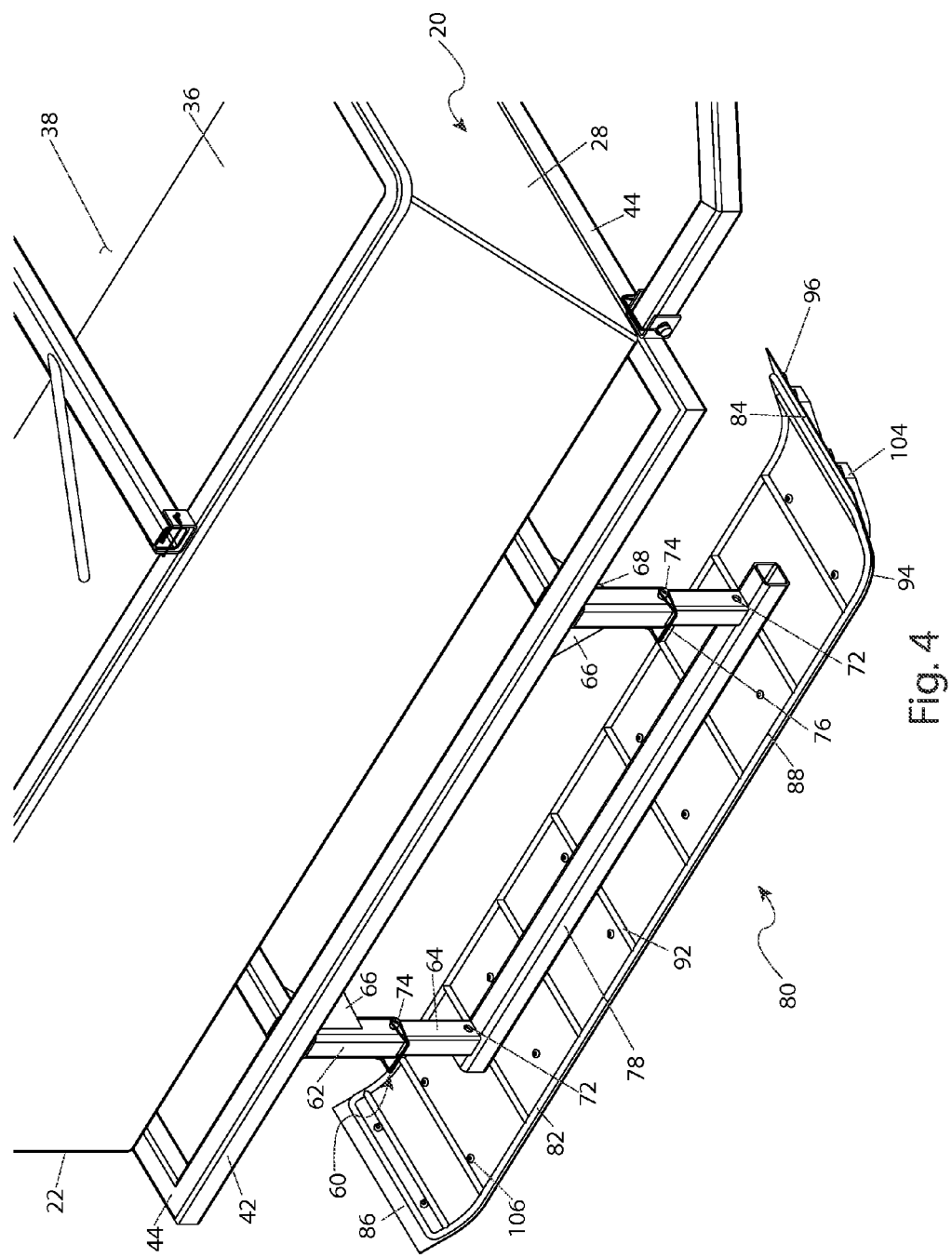
FIG. 4 is an isolated view of the legs 60 and skis 80 of the utility sled 10 in accordance with the preferred embodiment of the present invention.
Figure 5:
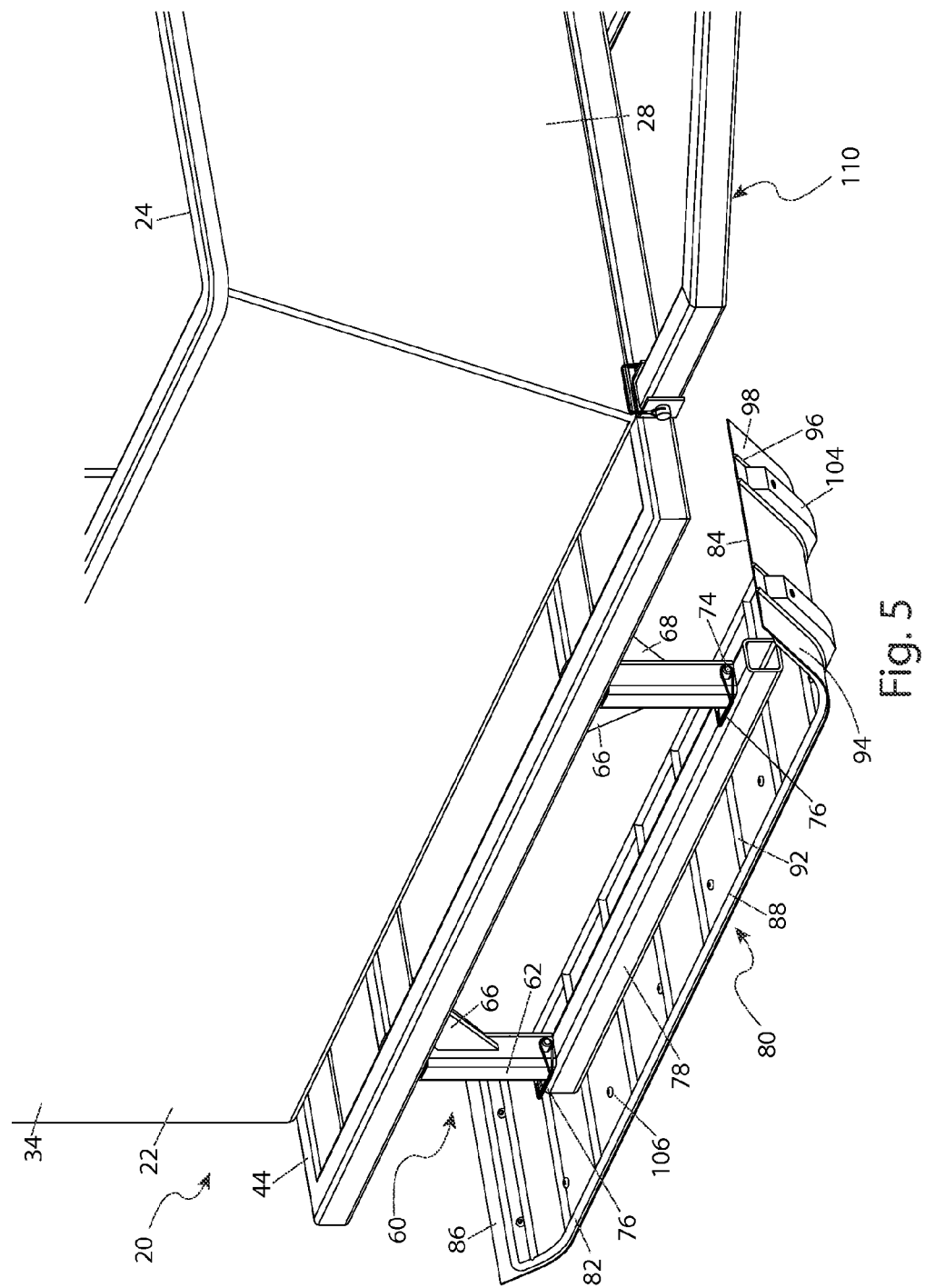
FIG. 5 is an isolated view of the legs 60 of the utility sled 10 depicted in a retracted position in accordance with the preferred embodiment of the present invention.

Referring now to FIG. 4, an isolated view of the legs 60 and skis 80 of the apparatus 10, according to the preferred embodiment of the present invention, is disclosed. The frame 20 is preferably supported on four (4) legs 60. The legs 60 include an upper leg member 62 with an upper leg inner brace 68 and an upper leg outer brace 66, and a lower leg member 64. The upper leg members 62 and the lower leg members 64 are preferably composed of square metal tubing. It is understood that other materials, or other shapes, may be utilized without limiting the scope of the apparatus 10. The lower leg members 64 are configured to fit within, and slide relative to, the upper leg members 62. The upper leg members 62 are attached, preferably by welding, perpendicularly to a lower side of the frame 40, specifically the lateral members 42. An upper leg outer brace 66 is attached as a gusset between the upper leg member 62 and the lateral member 42. The upper leg outer braces 66 are consistently oriented to be located between the legs 60. The upper leg inner brace 68 is attached as a gusset between the upper leg member 62 and a second cross member 46 of the frame 40. The lower leg members 64 are attached, preferably by welding, perpendicular to the ski supports 78. The ski supports 78 are preferably composed of square tubular metal. Disposed in a lower end of the upper leg member 62 is a leg aperture 72 for the installation of a leg pin 74. Disposed in the lower leg member 64 near both ends are two (2) leg apertures 72. The leg pins 74 are preferably headed, cylindrical metal rods provided with leg pin retainers 76 such as cotter pins, locking straps, or the like. In normal operation, the leg apertures 72 in the lower end of the upper leg member 62 are in alignment with the leg apertures 72 in the upper end of the lower leg member 64 with a leg pin 74 inserted to secure the configuration to achieve maximum ground clearance of the apparatus 10. During the loading or unloading of the apparatus 10, the frame 40 and the body 20 are stabilized on a hoisting device and the leg pins 74 are removed so that the frame 40 and the body 20 can be lowered to reduce the loading height. The frame 40 is preferably lowered sufficiently for the leg apertures 72 in the lower end of the upper leg member 62 to come into alignment with the leg apertures 72 in the lower end of the lower leg member 64, whereupon the leg pins 74 are reinserted into the newly aligned leg apertures 72 so as to secure the new configuration as illustrated in FIG. 5.

The skis 80 include a ski frame 82 and a runner 94. The ski frame 82 is configured to be a network of preferably round metal tubing formed into a rectangle with an upturned leading end 84 and trailing end 86 and having a plurality of cross tubes 92 connecting the lateral tubes 88 at some selected spacing. The ski frame 82 is attached, preferably by welding, to the ski supports 78 at the juncture of any cross tube 92 that is contacted. The runner 94 is preferably a rectangle of a high density polyethylene slightly larger than the ski frame 82 and attached to the ski frame 82 so as to be upturned at the leading end 84 and the trailing end 86. The runner 94 may be equipped with a plurality of longitudinal ridges 96 molded into the bottom face 98 to increase the structural rigidity thereof. The ridges 96 are spaced such that a ski insert 104 may be attached to the bottom face 98 of the runner 94 between each paired set of ridges 96. The ski insert 104 is configured to be a rectangular polyhedron composed of an ultra-high molecular weight polyethylene with, or without, additional graphite impregnation. The ski insert 104 is fastened to the runner with a plurality of threaded insert fasteners 106.

Figure 6:
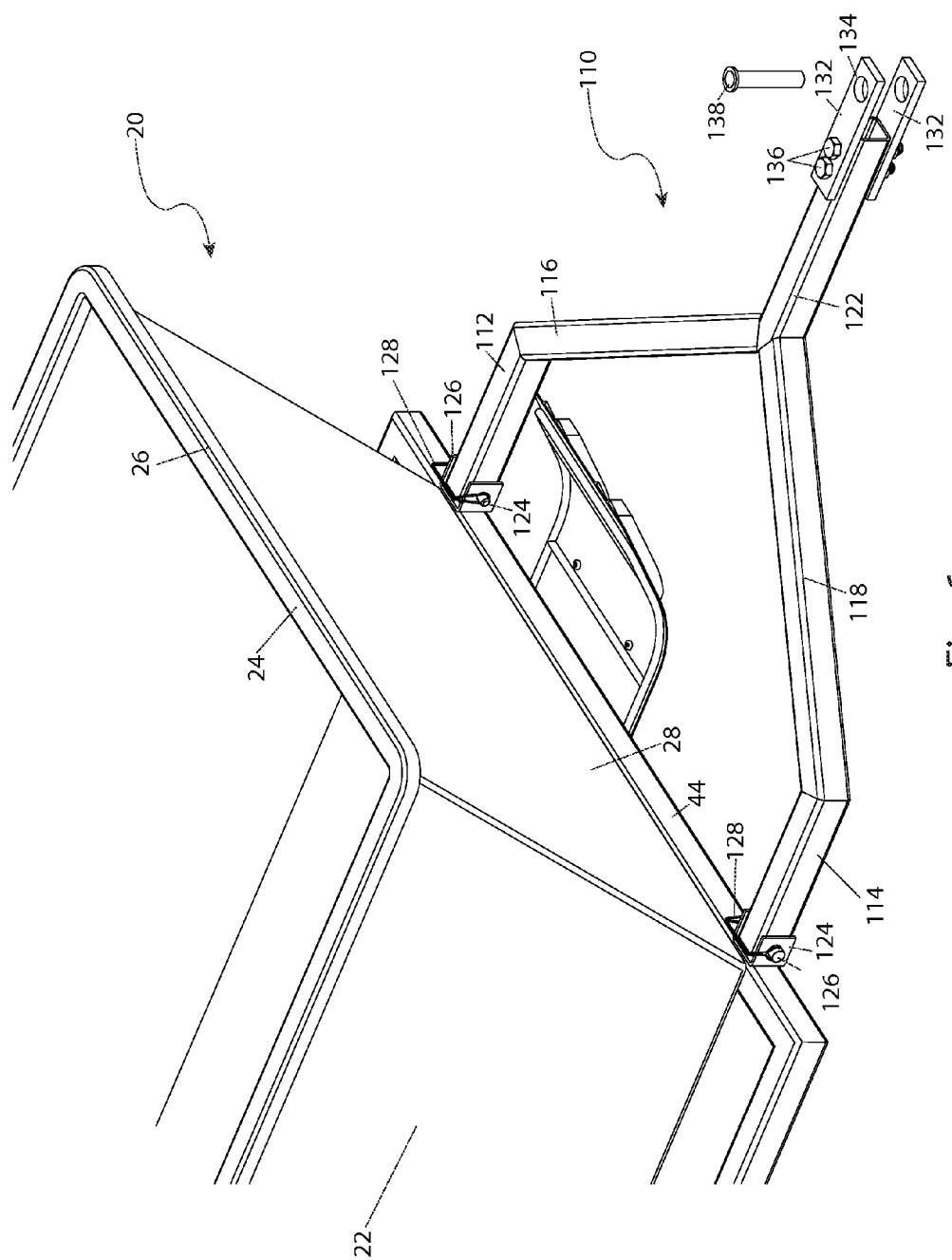
FIG. 6 is an isolated view of a tongue assembly 110 of the utility sled 10 in accordance with the preferred embodiment of the present invention.

Referring now to FIG. 6, an isolated view of the tongue assembly 110 of the apparatus 10, according to the preferred embodiment of the present invention, is disclosed. The tongue assembly 110 is preferably configured to be a welded tubular metal structure pivotally attached to the front 28 of the frame 40. The tongue assembly 110 is generally a "Y"-shaped weldment including a first lateral member 112, a parallel second lateral member 114, a first angled member 116, a mirrored second angled member 118, and a central member 122. The first angled member 116 and the second angled member 118 connect a distal end of the first lateral member 112 and a distal end of the second lateral member 114 respectively to a proximal end of the central member 122, with all members 112-122 lying in the same plane. All abutting joints of the tongue assembly 110 are preferably mitered for a smooth fit and a full penetration weld. A generally "C"-shaped tongue clevis 124 is attached, preferably by welding, at each end of the forward-most first cross member 44 along a front face thereof. The tongue clevis 124 is a metal bracket having aligned apertures (not shown) in the parallel members for the insertion of a clevis pin 126. The parallel members of the tongue clevis 124 are oriented perpendicular to the front face of the first cross member 44 while the centerline of the aligned apertures (not shown) is parallel to the longitudinal axis. The clevis pin 126 is preferably a headed, cylindrical metal rod provided with a clevis pin retainer 128 such as a cotter pin, a locking strap, or the like, for the retention thereof. Disposed in the proximal ends of the first lateral member 112 and the second lateral member 114 are apertures (not shown) into which the clevis pins 126 are inserted to attach the tongue assembly 110 to the frame 40 through the tongue devises 124. Attached at a distal end of the central member 122 is a pair of offset straps 132. The offset straps 132 are preferably metal plates attached to an upper face and a lower face of the central member 122 by means of at least two (2) threaded strap fasteners 136. The offset straps 132 are provided with strap apertures 134 in a distal end which align to accommodate the insertion of a hitch pin 138 to connect the apparatus 10 to a towing vehicle at a convenient hitch point.

Figure 8B:
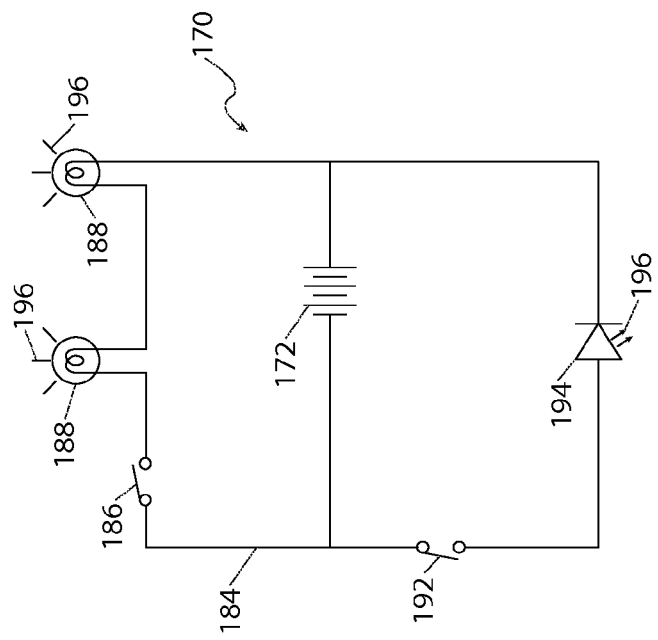
FIG. 8*a* is an isolated view of the interior light 194 of the utility sled 10 in accordance with the preferred embodiment of the present invention; and, FIG. 8*b* is a block diagram of the electrical system 170 of the utility sled 10 in accordance with the preferred embodiment of the present invention.
Figure 8A:
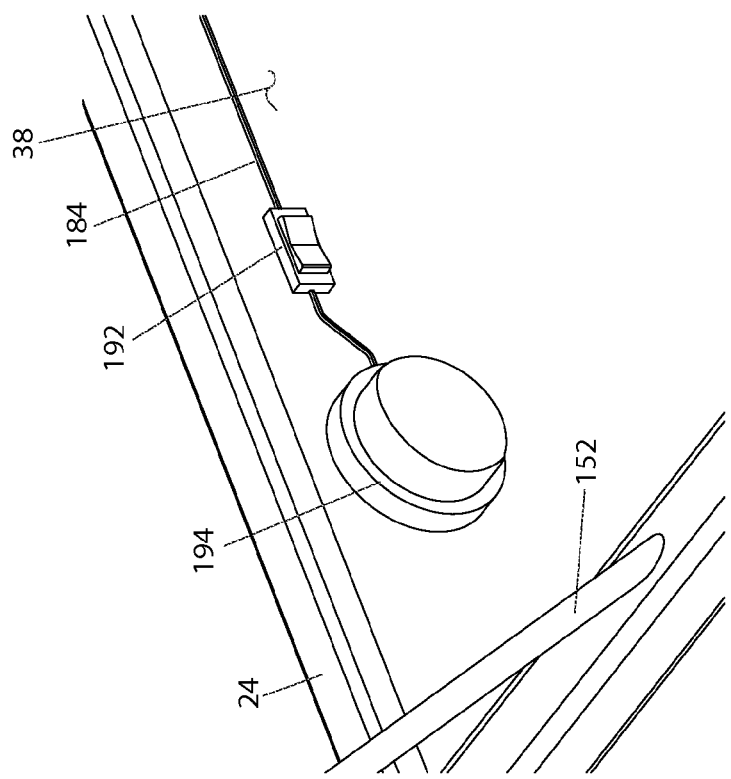

Referring now to FIGS. 7a, 7b, and 8a, isolated views of various parts of the electrical system 170, as well as FIG. 8b, a block diagram of the electrical system 170 of the apparatus 10, according to the preferred embodiment of the present invention, are disclosed. A rechargeable battery 172 is disposed within the interior 38 of the body 20. The battery 172 is preferably a wet cell, lead plate battery capable of producing sufficient voltage of direct current electrical power to operate the clearance lights 188 and the interior light 194. However, it is understood that other batteries 172, or other power technology, may be utilized without limiting the scope of the apparatus 10. The battery 172 is stabilized within the interior 38 of the body 20 by means of a battery anchor 174. The battery anchor 174 is configured to be a pair of metal angles affixed to the bottom 36 of the body 20 with mechanical fasteners, such as threaded fasteners. The angles are preferably oriented in a back-to-back arrangement, and spaced at a distance appropriate to accommodate the positioning of the battery 172 between them. A battery tie-down 176 is utilized to attach the battery 172 to the battery anchor 174. The battery tie-down 176 is preferably configured to be a metal angle supported on an upper corner of the battery 172 being attached to the battery anchor 174 by means of a pair of tie down fasteners 178 inserted into apertures (not clearly shown) in both the battery anchor 174 and in the battery tie-down 176. The tie down fasteners 178 are preferably "L"-shaped metal rods having a threaded end. A short leg of the "L" is inserted into an aperture in the battery anchor 174 while a longer leg, having a threaded end, is routed through an aperture in the battery tie-down 176 and secured with a wing nut 182. It is understood that other methods of securing the battery 172 in the apparatus 10 may be utilized without limiting the scope of the apparatus 10.

The apparatus 10 is provided with clearance lights 188 of which at least a two (2) are preferably located on a rear 34 portion of the body 20 as seen in FIG. 7b. Electrical power to provide the illumination 196 of the clearance lights 188 is supplied through conductors 184 attached to the battery 172 and selectively controlled by a clearance light switch 186 as presented in the block diagram of FIG. 8b. The clearance light switch 186 is preferably a rocker-type, two pole switch located on the interior 38 of the body 20. Other types of switches may be utilized without limiting the scope of the apparatus 10.

The apparatus 10 is provided with at least one (1) interior light 194 which is preferably located on a sidewall 22 in the interior 38 of the body 20 as seen in FIG. 8a. The interior light 194 preferably utilizes a plurality of light emitting diodes as the source of illumination 196; however, other types of lighting may also be utilized without limiting the scope. Electrical power to provide the illumination 196 of the interior light 194 is supplied through conductors 184 attached to the battery 172 and selectively controlled by an interior light switch 192 as presented in the block diagram of FIG. 8b.

The preferred embodiment of the present invention can be utilized by an enabled individual in a simple and straightforward manner with little or no training. After initial purchase or acquisition of the apparatus 10, it would be configured as illustrated in FIG. 1. The method of installing and utilizing the apparatus 10 may be achieved by performing the following steps: acquiring a model of the apparatus 10 having a desired style to suit the taste of a user; supporting the frame 40 and the body 20 to stabilize the height of the apparatus 10; removing the leg pin retainers 76 from the leg pins 74; removing the leg pins 74 from the aligned apertures of the upper leg members 62 and the lower leg members 64; lowering the frame 40 and the body for loading cargo; removing the pivot pin retainers 146 from the selected mounting bracket pivot pins 144 so as to pivotally move the ends of the first beam 148 and the second beam 158 away from the sidewall lip 24 on that side of the body 20 from which loading the cargo will occur; loading the selected cargo into the interior 38 of the body 20; reattaching the ends of the first beam 148 and the second beam 158 which had previously been disconnected; installing the cover 160 over the body 20 and placing the resilient band 162 under the sidewall lip 24 to secure the cover 160; placing the desired cargo in the rack assembly 140; raising the frame 40 and body 20 so as to properly align the apertures of the upper leg members 62 with the apertures in the lower leg members 64; inserting the leg pins 74 into the now aligned apertures; reinstalling the leg pin retainers 76; connecting the apparatus to the towing vehicle by inserting a hitch pin 138 into the strap aperture 134 and whatever provision exists on the towing vehicle for the safe towing of trailing equipment; towing the apparatus 10 with the selected cargo to the desired destination. The cargo can be utilized by reversing the previous procedure to unload the desired cargo. The clearance lights 188 may be illuminated as needed by turning on the clearance light switch 186 at the rear 34 of the body 20. The interior light 194 may be illuminated by turning on the interior light switch 192.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A sled, comprising:
a frame;
a body mounted on said frame;
a rack assembly mounted to a portion of said body; and,
a pair of ski assemblies each attached to a bottom of said frame, each comprising:
  a ski frame, comprising an elongated body with an upturned first distal end;
  a pair of posts upstanding from said ski frame, each slidably affixed and able to be secured into bottom ends of one of a pair of legs extending downward from said sled frame;
  a plurality of cross-members spaced equidistantly along said ski frame and oriented perpendicularly therefrom; and,
  a runner longitudinally attached to and coextensive with said ski frame and said plurality of cross-members;
wherein said frame is configured to be towed by a vehicle; and,
wherein said rack assembly is adapted to securably retain items therein.

2. The sled of claim 1, wherein said body has a planar bottom and encircling sidewalls with a peripheral lip; and,
wherein said rack assembly is mounted to said lip.

3. The sled of claim 1, wherein each rack assembly comprises:
a first beam;
a second beam; and,
at least a pair of posts;
wherein each beam is in the shape of a square tube and each post is in the shape of a cylindrical bar;
wherein each post is secured near a midpoint of one of said beams at a distance from any other post on a respective one of said beams equidistant from the midpoint of said beam;
wherein each post is oriented parallel to the longitudinal axis of said beam in a vertical plane; wherein disposed at both ends of said first beam and said second beam is an aperture; and,
wherein said first beam and said second beam are secured to "C" shaped rack mount brackets by means of rack mount bracket pivot pins.

4. The sled of claim 1, wherein each runner further comprises a plurality of longitudinal ridges molded into a bottom face thereof;
wherein said ridges are sized so as to enable a ski insert to be inserted on said runner between adjacent ridges.

5. A sled, comprising:
a frame;
a body mounted on said frame;
a rack assembly mounted to a portion of said body;
a pair of ski assemblies each attached to a bottom of said frame, each comprising:
  a ski frame, comprising an elongated body with an upturned first distal end;
  a pair of posts upstanding from said ski frame, each slidably affixed and able to be secured into bottom ends of one of a pair of legs extending downward from said sled frame;
  a plurality of cross-members spaced equidistantly along said ski frame and oriented perpendicularly therefrom; and,
  a runner longitudinally attached to and coextensive with said ski frame and said plurality of cross-members; and,
a cover removably placed over said body;
wherein said sled frame is configured to be towed by a towing vehicle; and,
wherein said rack assembly is adapted to securably retain items therein.

6. The sled of claim 5, wherein said body has a planar bottom, encircling sidewalls with a peripheral lip;
wherein said rack assembly is mounted to said lip.

7. The sled of claim 5, wherein each rack assembly comprises:
a first beam;
a second beam; and,
at least a pair of posts;
wherein each beam is in the shape of a square tube and each post is in the shape of a cylindrical bar;
wherein each post is secured near a midpoint of one of said beams at a distance from any other post on a respective one of said beams equidistant from the midpoint of the beam;
wherein each post is oriented parallel to the longitudinal axis of said beam in a vertical plane; wherein disposed at both ends of said first beam and said second beam is an aperture; and,
wherein said first beam and said second beam are secured to "C" shaped rack mount brackets by means of rack mount bracket pivot pins.

8. The sled of claim 5, wherein each runner further comprises a plurality of longitudinal ridges molded into a bottom face thereof;
wherein said ridges are sized so as to enable a ski insert to be inserted on said runner between adjacent ridges.

9. A sled, comprising:
a frame;
a body mounted on said frame;
a rack assembly mounted to a portion of said body;
a pair of ski assemblies each attached to a bottom of said frame, each comprising:
  a ski frame, comprising an elongated body with an upturned first distal end;
  a pair of posts upstanding from said ski frame, each slidably affixed and able to be secured into bottom ends of one of a pair of legs extending downward from said sled frame;
  a plurality of cross-members spaced equidistantly along said ski frame and oriented perpendicularly therefrom; and,
  a runner longitudinally attached to and coextensive with said ski frame and said plurality of cross-members; and,
a cover removably placed over said body;
wherein said frame is configured to be towed by a towing vehicle; and, wherein said body further comprises an illumination means in electrical communication with a power source for providing illumination in a vicinity of said sled; and, wherein said rack assembly is adapted to securably retain items therein.

10. The sled of claim 9, wherein said body has a planar bottom, encircling sidewalls with a peripheral lip;

wherein said rack assembly is mounted to said lip.

11. The sled of claim 9, wherein each rack assembly comprises:

a first beam;

a second beam; and, at least a pair of posts;

wherein each beam is in the shape of a square tube and each post is in the shape of a cylindrical bar;

wherein each post is secured near a midpoint of one of said beams at a distance from any other post on a respective one of said beams equidistant from the midpoint of the beam;

wherein each post is oriented parallel to the longitudinal axis of said beam in a vertical plane; wherein disposed at both ends of said first beam and said second beam is an aperture; and, wherein said first beam and said second beam are secured to "C" shaped rack mount brackets by means of rack mount bracket pivot pins.

12. The sled of claim 9, wherein each runner further comprises a plurality of longitudinal ridges molded into a bottom face thereof;

wherein said ridges are sized so as to enable a ski insert to be inserted on said runner between adjacent ridges.

13. The sled of claim 10, wherein said illumination means further comprises at least one clearance light located on a rear portion of said body selectively controlled by a clearance light switch.

14. The sled of claim 10, wherein said illumination means further comprises at least one interior light located on an inner surface of one of said sidewalls selectively controlled by an interior light switch.

\* \* \* \* \*